United States Patent

[11] 3,579,120

[72] Inventors Peter Curran
Hastings-on-Hudson, N.Y.;
John Delistovich, Jersey City, N.J.
[21] Appl. No. 812,575
[22] Filed Mar. 28, 1969
[45] Patented May 18, 1971
[73] Assignee The Bendix Corporation

[54] SELF-TESTING LOGIC GATE
5 Claims, 2 Drawing Figs.
[52] U.S. Cl.................................................. 328/92,
307/204, 307/211, 307/232, 307/243, 328/147
[51] Int. Cl........................................................H03k 19/00,
H03k 5/20
[50] Field of Search........................................ 328/92, 93,
94, 146, 147; 307/204, 219, 211, 243, 244, 232;
324/60; 330/300, 69

[56] References Cited
UNITED STATES PATENTS
3,317,753 5/1967 Mayhew....................... 307/211
3,321,639 5/1967 Fowler......................... 307/219
3,496,407 2/1970 Entenmann................... 330/69

Primary Examiner—John S. Heyman
Assistant Examiner—David M. Carter
Attorneys—Anthony F. Cuoco and Plante, Arens, Hartz, Hix and Smith ABSTRACT: A self-testing logic gate used in redundant control systems performs logic functions on AC coded input signals by means of an input resistor network and a differential amplifier having inverting and noninverting inputs. The amplifier is responsive to the AC inputs for providing a square wave output and when a logic circuit failure occurs, normally balanced DC amplifier inputs are unbalanced so that the amplifier provides a steady state DC output.

INVENTORS
PETER F. CURRAN
JOHN E. DELISTOVICH
BY
ATTORNEY

3,579,120

SELF-TESTING LOGIC GATE

BACKGROUND OF THE INVENTION

1. Field of the Invention

This invention relates to logic gates used in redundant control systems and, more particularly, to logic gates of the type described having self-testing capabilities.

2. Description of the Prior Art

In order to achieve a high degree of reliability in automatic control systems for aircraft, system monitoring and testing are essential. When a monitor detects a failure in one redundant system, operation is switched to another such system. However, reliability through redundancy is achieved only when the systems are thoroughly tested to insure that actual redundancy is at the desired level. Since the monitor is in operation as long as the system, the monitor contributes directly to the overall system failure rate and must be redundant. Test apparatus, on the other hand, operates for only short periods of time, generally before each flight, and contributes indirectly to system failure rates so that redundancy is not required.

It will now be understood, then, that the monitor must be tested to insure the proper redundancy level. The problem encountered is that test apparatus must generate every logic switching state to perform a valid test on the monitor. The problem is magnified when it is considered that in the case of sequential logic, every permutation of logic states must be tested. In triple redundant fail operational systems, the redundant logic required to prevent a single failure from disengaging the system must be tested and in dual-dual redundant systems, the monitoring apparatus including logic which is quadrupled for fail safe operation must likewise be tested. Prior to the present invention, test apparatus satisfying these requirements has often been more complex than the logic tested and in some instances testing was prohibitive. The self-testing logic gate of the invention alleviates this condition.

SUMMARY OF THE INVENTION

This invention contemplates a self-testing logic gate including a resistor network for linearly summing AC coded input signals at high and low logic levels and a differential amplifier having inverting and noninverting inputs connected to the resistor network and switching from saturation in one sense to saturation in another sense in response to the input signals for providing a square wave output. The gate is tested by applying a common DC signal to balance the amplifier inputs, and when a failure occurs the balance is offset so that the amplifier provides a steady state DC output signal.

One object of this invention is to eliminate external test apparatus for testing the logic used in monitors for redundant control systems by providing a self-testing logic gate.

Another object of this invention is to provide said gate so as to eliminate the need for testing the logic by comparison between identical test units.

Another object of this invention is to increase the reliability of redundant control systems by permitting system design whereby monitor failures do not contribute to the overall system failure rate.

Another object of this invention is to reduce the complexity of redundant control system monitors by providing said monitors with self-testing capability.

Another object of this invention is to provide a self-testing logic gate capable of operating directly upon a single error detecting code, thereby meeting the above objects by permitting the implementation of self-testing logic blocks and providing fail safe communication between said blocks without adding to the complexity of the logic performed.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
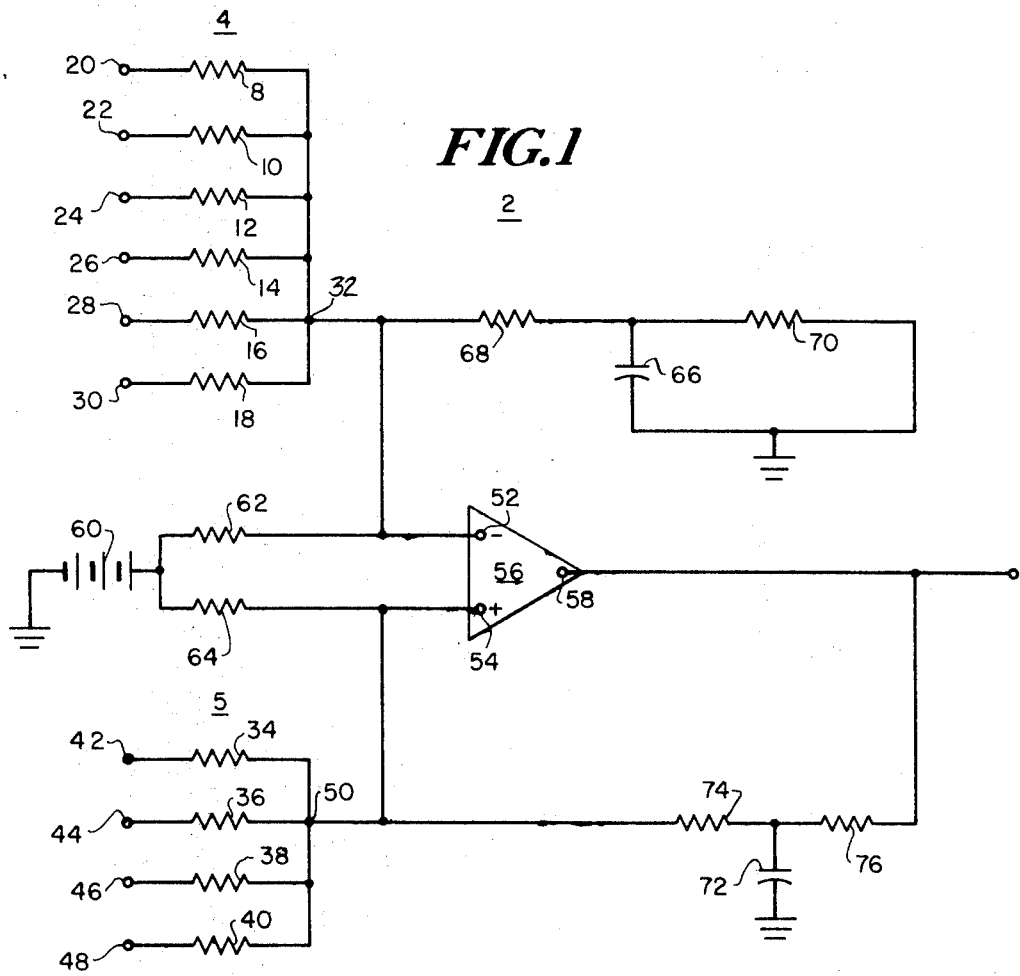
FIG. 1 is an electrical schematic diagram of the self-testing logic gate of the invention.
Figure 2:
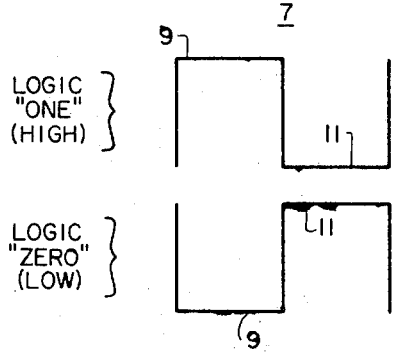
FIG. 2 is a graphical representation showing waveforms of AC coded input signals applied to the logic gate shown in FIG. 1.

Referring to FIG. 1, a self-testing logic gate 2 according to the invention includes a linear resistor network 4 and a linear resistor network 5. Network 4 includes resistors 8, 10, 12, 14, 16 and 18 for connecting input signals 7 applied to input terminals 20, 22, 24, 26, 28 and 30, respectively, to a summing point or junction 32 and network 5 includes resistors 34, 36, 38 and 40 for connecting input signals 7 applied to input terminals 42, 44, 46 and 48 to a summing point or junction 50. Input signals 7 have waveforms as shown in FIG. 2 and may be at logic one (HIGH) or logic zero (LOW) logic levels. Signals 7 have information bits 9 and parity check bits 11 and the logic one and logic zero signals are out of phase as shown in FIG. 2, and in this respect signals 7 are transmitted to an amplifier 56 in accordance with a 2-bit single error detecting AC code. It will be understood that any number of signals 7 may be so transmitted with the number herein being limited to 10 for purposes of illustration.

Summing point 32 is connected to an inverting input terminal 52 of amplifier 56 and summing point 50 is connected to a noninverting input terminal 54 of amplifier 56. Amplifier 56 has an output terminal 58. The output from a source of constant direct current such as a battery 60 is applied through equal resistors 62 and 64 to input terminals 52 and 54, respectively, so that the DC voltages at said input terminals normally match or balance out. Under this condition amplifier 56 is not affected by the DC signals and is responsive to signals 7 for alternately switching from saturation in one polarity or sense to saturation in the opposite polarity or sense for providing a square wave output at output terminal 58.

Summing point 32 is connected to a grounded capacitor 66, and which capacitor 66 is connected intermediate a resistor 68 connected to input terminal 52 and a grounded resistor 70. Summing point 50 is connected to a grounded capacitor 72, and which capacitor 72 is connected intermediate a resistor 76 and a resistor 74. Resistor 76 is connected to output terminal 58 and resistor 74 is connected to input terminal 54 providing a positive feedback loop around amplifier 56.

OPERATION

It will now be seen that signals 7 are serially transmitted in a 2-bit single error detection code and if check bits 11 generate odd parity the logic signal at output terminal 58 of amplifier 56 has a square waveform. Since the even parity condition obtained following a failure is actually a DC signal, it is simply necessary to check for the presence of the AC signals to check the logic interfaces. The logic can be simplified by connecting capacitors 66 and 72 as shown in FIG. 1. This capacitor coupling produces an AC logic code with three states; the phase corresponding to logic one, the phase corresponding to logic zero and the lack of an AC signal. A considerable amount of flexibility is thus provided when implementing failure logic because two of the three states (a signal phase shift and the lack of an AC signal) can be interpreted as failure indications.

Logic gate 2 is arranged so that logic is performed by resistors 8 to 40 and resistors 62 and 64 are selected so that the DC voltage from battery 60 at inverting input terminal 52 and noninverting input terminal 54 of amplifier 56 normally match or balance with a square wave output being provided at output terminal 58 of amplifier 56. Resistors 68 and 74 are selected so that the DC differential input following a logic failure is always greater than the normal AC differential input at said amplifier inputs to insure that the DC voltage from battery 60 overrides the AC voltage from summing points 40 and 50.

Amplifier 56 then fails to switch and a DC output is provided at output terminal 58 thereof to signal the failure.

The positive feedback path through resistors 76 and 74 tests the operation of capacitor 72. Thus, if capacitor 72 fails, the circuit will latch and a DC output will be provided at output terminal 58 of amplifier 56. Capacitor 66 balances capacitor 72 as gate 2 is turned on. Hence, if the time constant of the capacitors varies significantly due to a failure, the circuit will immediately latch providing a DC output at output terminal 58 to again signal that a failure has occurred. Differential amplifier 56 is also tested because it must switch from one saturated state to another and have a small offset to provide the square wave output as heretofore noted. In short, gate 2 is designed to detect any internal component failure. A failure of the resistors 8—40 unbalances the DC input to amplifier 56 and affects the switching thereof to the extent that that amplifier provides a DC output at output terminal 58 thereof.

Gate 2 is capable of operating in the above-noted error detecting code directly. In normal operation input signals 7 and the respective resistors in networks 4 and 5 establish the level of input states required for amplifier 56 to switch from one state to the other. Unlike conventional gates, the logic function performed can be continually varied by changing the level of the threshold input. Therefore, switching the threshold input between +1 and −1 (see FIG. 2) allows gate 2 to perform the same operation in negative logic on parity check bits 11 of signals 7 that it performs in positive logic on information bit 9.

In summation, the logic gate of the invention performs logic functions directly on AC coded input signals 7 by means of linear input resistor networks 4 and 5 and differential amplifier 56, while a test is simultaneously performed upon the networks and differential amplifier by applying a common DC signal to inputs 52 and 54 of amplifier 56. The DC signals normally balance, and which balance is offset sufficiently by any logic or internal gate failure to effect amplifier 56 so that a steady state DC output is provided at output terminal 58 thereof to signal said failure.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. A self-testing logic gate, comprising:
   a resistor network for linearly summing AC coded input signals at high and low logic levels and including a first summing junction and a plurality of resistors for connecting a corresponding plurality of the input signals to the first summing junction, and a second summing junction and a second plurality of resistors for connecting a corresponding plurality of said input signals to the second summing junction;
   a differential amplifier having an inverting input terminal connected to one of the first and second summing junctions and a noninverting input terminal connected to the other of the first and second summing junctions;
   means for providing a DC signal connected to the inverting and noninverting input terminals of the amplifier so that the DC inputs at said terminals are normally balanced;
   a first capacitor connected to the one summing junction and connected to the inverting input terminal of the amplifier and a second capacitor connected to the other summing junction and to the noninverting input terminal of the amplifier;
   said amplifier normally responsive to the AC coded input signals to as to switch from saturation in one sense to saturation in the opposite sense and cooperating with the first and second capacitors to transmit the error signals in accordance with a 2-bit single error detection code for providing a square wave at the amplifier output terminal; and
   a logic failure being effective to offset the DC balance at the amplifier inputs so as to inhibit said switching whereby a steady state DC signal is provided at the amplifier output terminal.

2. A self-testing logic gate as described by claim 1, including:
   a first resistor connected to the inverting input terminal of the amplifier;
   a second resistor connected to ground and connected to the first resistor;
   said first capacitor connected intermediate the first and second resistors;
   a third resistor connected to the noninverting input of the amplifier;
   a fourth resistor connected to the amplifier output terminal and connected to the third resistor; and
   said second capacitor connected intermediate the third and fourth resistors.

3. A self-testing logic gate as described by claim 2, wherein:
   the first and third resistors are selected so that the differential DC input at the amplifier input terminals following a logic failure is always greater than the normal AC differential input thereat so that the DC input overrides the AC input whereby the amplifier provides a DC output at the output terminal thereof to signal the failure.

4. A self-testing logic gate as described by claim 2, wherein:
   the third and fourth resistors are arranged in positive feedback relation for testing the second capacitor whereby a failure in said capacitor causes the gate to latch for providing a DC output at the amplifier output terminal to signal the failure.

5. A self-testing logic gate as described by claim 2, wherein:
   the time constant of the first capacitor normally balances the time constant of the second capacitor so that when said first-mentioned time constant varies due to a failure in the first capacitor the gate latches for providing a DC output at the amplifier output terminal to signal a failure.